US009448818B2

United States Patent
Malcolm

(10) Patent No.: US 9,448,818 B2
(45) Date of Patent: Sep. 20, 2016

(54) DEFINING CLASSES AS SINGLETON CLASSES OR NON-SINGLETON CLASSES

(71) Applicant: Red Hat, Inc., Raleigh, NC (US)

(72) Inventor: David H. Malcolm, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 90 days.

(21) Appl. No.: 14/181,315

(22) Filed: Feb. 14, 2014

(65) Prior Publication Data

US 2015/0234667 A1 Aug. 20, 2015

(51) Int. Cl.
*G06F 9/45* (2006.01)
*G06F 9/445* (2006.01)

(52) U.S. Cl.
CPC .......... *G06F 9/44521* (2013.01); *G06F 8/443* (2013.01)

(58) Field of Classification Search
None
See application file for complete search history.

(56) References Cited

U.S. PATENT DOCUMENTS

| | | |
|---|---|---|
| 6,430,627 B1 | 8/2002 | Utas |
| 6,453,460 B1 | 9/2002 | Keyes |
| 6,779,188 B1 | 8/2004 | Blandy et al. |
| 7,107,575 B1 | 9/2006 | Mor et al. |
| 7,165,162 B2 | 1/2007 | Li et al. |
| 7,181,686 B1 * | 2/2007 | Bahrs ........................... 715/210 |
| 7,380,234 B2 | 5/2008 | Gil et al. |
| 7,716,657 B2 | 5/2010 | Inglis et al. |
| 7,743,368 B2 | 6/2010 | Das |
| 7,793,277 B2 | 9/2010 | Schmidt |
| 8,091,069 B2 | 1/2012 | Rojer |
| 2003/0051234 A1 * | 3/2003 | Schmidt ........................ 717/158 |
| 2004/0133659 A1 * | 7/2004 | Lacey ..................... G06F 9/548 709/219 |
| 2005/0125772 A1 * | 6/2005 | Kohno ........................... 717/104 |
| 2007/0156768 A1 * | 7/2007 | Harrington et al. .......... 707/200 |
| 2007/0240135 A1 * | 10/2007 | Stoodley et al. ............. 717/140 |
| 2009/0044173 A1 * | 2/2009 | Kohno ..................... G06F 8/70 717/121 |
| 2009/0089748 A1 | 4/2009 | Bumgarner |
| 2009/0276771 A1 * | 11/2009 | Nickolov et al. ............. 717/177 |
| 2010/0199259 A1 * | 8/2010 | Quinn et al. .................. 717/106 |
| 2011/0145785 A1 * | 6/2011 | Centonze et al. ............ 717/108 |

(Continued)

FOREIGN PATENT DOCUMENTS

| | | |
|---|---|---|
| CN | 101211273 A | 7/2008 |
| CN | 101211273 B | 5/2010 |

OTHER PUBLICATIONS

Baumgartner, Gerald, et al.—On the Interaction of Object-Oriented Design Patterns and Programming Languages, Purdue University, 1996.

(Continued)

*Primary Examiner* — Daxin Wu
(74) *Attorney, Agent, or Firm* — Lowenstein Sandler LLP

(57) ABSTRACT

One or more of the classes is defined using an attribute or keyword that indicates that the one or more classes may be defined as singleton classes or non-singleton classes (a class that may be instantiated more than once). A compiler system converts the class to a singleton class when the compiler system receives a command or request indicating that the class is to be defined as a singleton class. Various optimizations may be performed when one or more of the classes in the source code are defined as singleton classes. The compiler system may not convert the class to a singleton class when the compiler system receives a command or request indicating that the class is to be defined as a non-singleton class.

20 Claims, 6 Drawing Sheets

(56) References Cited

U.S. PATENT DOCUMENTS

2011/0245089 A1* 10/2011 Scott ................. G06F 19/366
 506/7
2012/0089962 A1* 4/2012 Centonze et al. ............ 717/110

OTHER PUBLICATIONS

Townsend, Mark—Exploring the Singleton Design Pattern, Microsoft Corporation, Feb. 2002.

Google, "Google Singleton Detector," Find Singletons and Global State in Java Programs, Available at: https://code.google.com/p/google-singleton-detector/wiki/Singleton, 2007.

Chiba, Shigeru, et al.—An Easy-to-Use Toolkit for Efficient Java Bytecode Translators, 2003.

Tip, Frank, et al.—"Class Hierarchy Specialization," IBM T.J. Watson Research Center, Jul. 2010.

Geary, David—"Simply Singleton" Webpage, Apr. 25, 2003.

* cited by examiner

DEFINING CLASSES AS SINGLETON CLASSES OR NON-SINGLETON CLASSES

TECHNICAL FIELD

The present disclosure relates to object oriented programming, and more particularly, to defining classes as singleton classes or non-singleton classes.

BACKGROUND

Object-oriented programming (OOP) may be a programming paradigm that represents concepts as "classes." The classes may define members such as data fields (e.g., data or attributes that describe the object such as variables, data structures, and/or objects) and/or procedures (e.g., methods or functions) to perform tasks and/or operations. The classes may be defined in source code for an application. A compiler system may generate (e.g., build) an application based on the source code. The compiler system may be capable of performing various optimizations when generating an application based on the source code.

BRIEF DESCRIPTION OF THE DRAWINGS

The present disclosure will be understood more fully from the detailed description given below and from the accompanying drawings of various implementations of the disclosure.

DETAILED DESCRIPTION

Source code for an application may define classes. Classes may include and/or define members such as data fields (e.g., data or attributes that describe the object such as variables, data structures, and/or objects) and/or procedures (e.g., methods or functions) to perform tasks and/or operations. When classes defined in the source code are defined as singleton classes (e.g., a class that is instantiated at most once), a compiler system may be able to perform one or more optimizations when generating the application. However, because a singleton class may be instantiated at most once, the single instance of the singleton may be accessed by multiple other classes and this may result in concurrency errors. For example, multiple classes may update a member (e.g., a variable) of a singleton class and the value of the member may be inconsistent because multiple classes may update the member. If the class is defined to be a non-singleton class, this may reduce the amount of concurrency errors that may result. Generally, once a class is defined as a singleton class or a non-singleton class, the class may not be re-defined unless the source code is changed (e.g., by a programmer).

Described herein are mechanisms for defining one or more classes as singleton classes or non-singleton classes and/or performing one or more optimizations when generating an application. The source code for an application may define a plurality of classes. One or more of the classes may be defined using an attribute or keyword that indicates that the one or more classes may be defined as singleton classes or non-singleton classes (a class that may be instantiated more than once). In one embodiment, the compiler system may convert the class to a singleton class when the compiler system receives a command or request indicating that the class is to be defined as a singleton class. Various optimizations may be performed when one or more of the classes in the source code are defined as singleton classes. For example, the compiler system may de-virtualize virtual functions and/or remove references/pointers to objects when making function calls and/or accessing data members of the class. The one or more optimizations may allow the application to execute more efficiently. In another embodiment, the compiler system may not convert the class to a singleton class when the compiler system receives a command or request indicating that the class is to be defined as a non-singleton class. This may reduce the concurrency errors in the application or library generated from the source code.

Figure 1:
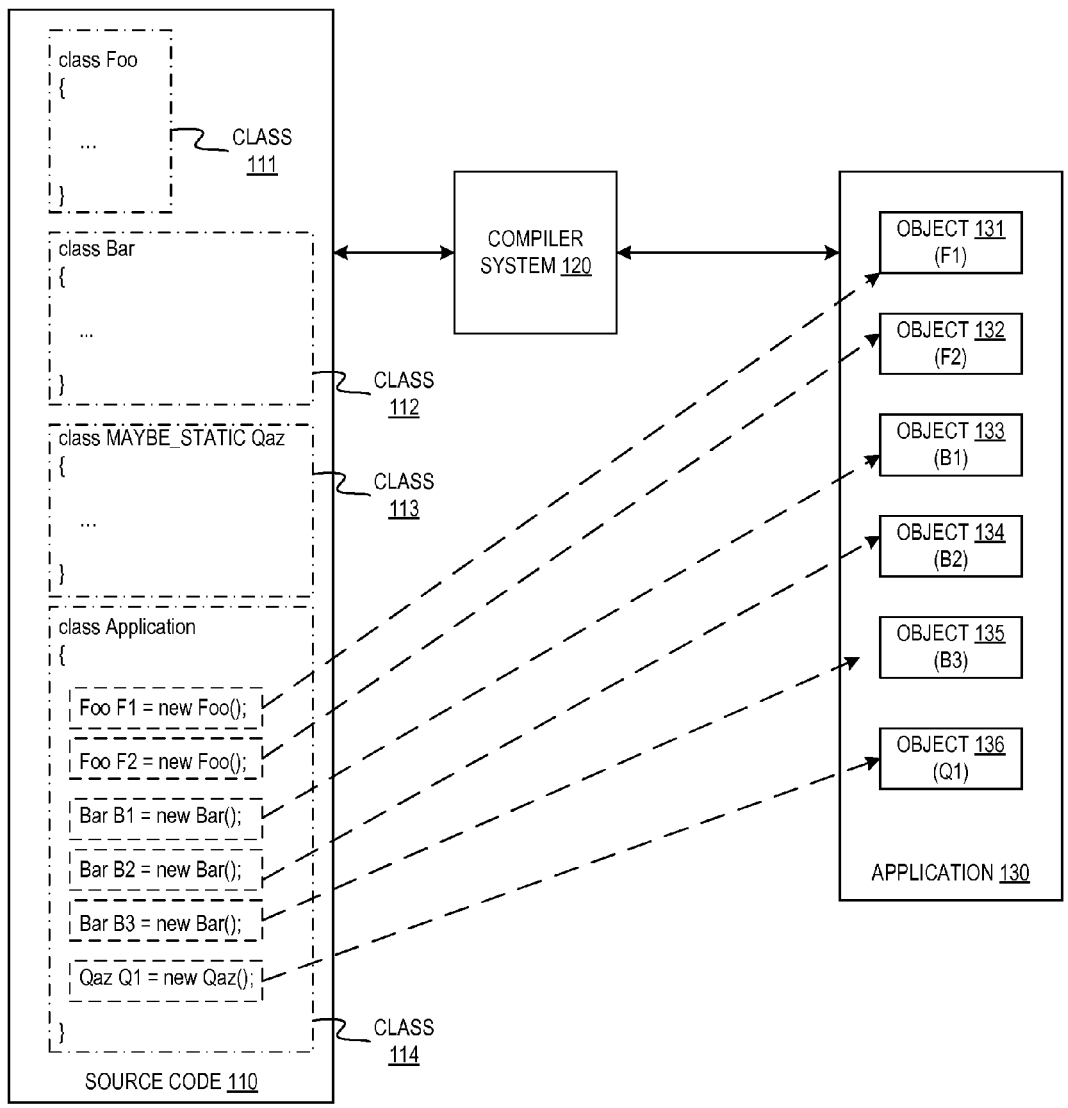
FIG. 1 is a block diagram illustrating example source code, an example compiler system, and an example application, in accordance with one embodiment of the present disclosure.

FIG. 1 is a block diagram illustrating example source code 110, an example compiler system 120, and an example application 130, in accordance with one embodiment of the present disclosure. The source code 110 may use object-oriented programming. The application 130 may be an object-oriented program or an object-oriented application. Object-oriented programming (OOP) may be a programming paradigm that represents concepts as "classes." The classes may define members such as data fields (e.g., data or attributes that describe the object such as variables, data structures, and/or objects) and/or procedures (e.g., methods or functions) to perform tasks and/or operations. A data field may be referred to as a data member and a method/function may be referred to as a member function. The source code 110 defines a plurality of classes, as discussed below. The source code may include one or more files (e.g., source code files). A class may be instantiated into instances of the class. An instance of the class may be referred to as a class object, an instance object and/or an object. An object oriented program or application may be a collection of interacting objects. In OOP, each object may send and/or receive messages to other objects, process data, etc. OOP may allow members of a class (e.g., variables, other objects, etc.) to be placed where they are not directly accessible by the rest of the application or program. Instead, the members may be accessed using functions or methods that are defined by the class (other members of the class). The functions or methods may act as the intermediaries for retrieving or modifying the members of an object (e.g., an instance of a class). An object-oriented program or application (e.g., application 130) may include different types of objects and different numbers of each type of object, each corresponding to a particular set of data and/or real-world object or concept (e.g., an animal, a vehicle, a person, etc.).

A class may be thought of as encapsulating its members (e.g., variables, other objects, etc.) within a set of methods or functions that may help ensure the members of the class are accessed and/or used properly. For example, a class may provide a set of methods or functions for performing particular operations on its members (e.g., variables, data objects, etc.) while concealing the specifics of how the particular operations are accomplished. OOP may also allow standardized methods to be provided across different types of classes. For example, different types of objects may include methods or functions to print out values for members of a class. Each type of class may define a different print method or function that may print out different values for data members of the class and/or print out the values in different formats. However, the print methods or functions may be called in a standardized manner. OOP may allow classes and/or code to be reused across different applications. OOP also allows modifications to members of the class to be made without requiring that other classes be modified.

As illustrated in FIG. 1, source code 110 may include and/or define classes 111, 112, 113, and 114. Each of the classes 111, 112, 113, and 114 may define members (not shown in FIG. 1), such as data members (e.g., variables, objects, data structures, etc.) and/or member functions (e.g., methods or functions that perform one or more operations). Class 112 includes data member Ff (which is a variable set to the integer value 10). Class 114 defines data members F1, F2, B1, B2, B3, and Q1. F1 is an instantiation or instance of the class 111 (e.g., the class Foo), F1 and F2 are instantiations or instances of the class 111 (e.g., the class Foo). B1, B2, and B3 are instantiations or instances of the class 112 (e.g., the class Bar). Q1 is an instantiation or instance of class 113 (e.g., the class Qaz). The source code 110 may span one or more source code files (e.g., files or documents that include source code). For example, each of the classes 111, 112, 113, and 114 may be included in a separate source code file. In another example, two or more of the classes 111, 112, 113, and 114 may be included in a single source code file. The source code 110 may be in various programming languages including, but not limited to, C++, JAVA, C#, etc. In other embodiments, the source code 110 may include different types and/or different numbers of classes and each class may define different members (e.g., variables, data structures, objects, methods or functions, etc.).

In one embodiment, the compiler system 120 may be an application (e.g., a software module, a program, etc.) and/or a set of applications that may transform the source code (written in a programming language such as C++) into one or more executable binaries (e.g., one or more binary files). An example of a compiler system may include, but is not limited to, the GNU compiler collection (GCC). The compiler system 120 may generate the application during an application generation process. For example, the compiler system 120 may build or generate the application from the source code 110 during the application generation process. The compiler system 120 may include a compiler. The compiler may be an application or program that translates the source code 110 into assembly code. The compiler may generate the assembly code during a compiling phase of the application generation process. The compiler system 120 may also include an assembler. The assembler may be an application or program that translates the assembly code generated by the compiler into machine code. The assembler may translate the assembly code during an assembling phase of the application generation process. The assembler may output one or more object files that include the machine code. The compiler system 120 may further include a linker. The linker may be a program or application that combines (e.g., links) the one or more object files generated by the assembler into one or more executable binaries (e.g., one or more executables or executable files). The linker may combine the one or more object files during a linking phase of the application generation process. In one embodiment, the application 130 may be an executable binary (e.g., an executable file) generated by the compiler system 120 from the source code 110. Although the application 130 is described in the disclosure, in other embodiments, the compiler system 120 may generate a library (e.g., a collection of software modules) based on the source code. The optimizations discussed below in conjunction with FIGS. 2-4 may be performed when generating the library.

A design pattern may be a solution to a commonly occurring problem that may occur when designing applications (e.g., software program). A design pattern may be thought of as a description or template for how to solve a problem that can be used in many different situations. A singleton design pattern may be a design pattern where a class is instantiated at most once in an application, software module, and/or software program. A class that is instantiated at most once may be referred to as a singleton class. The instantiation of a singleton class may be referred to as a singleton object. A user (e.g., a programmer) may define a class as singleton class when the user generates the source code 110. For example, in programming languages such as C++ or JAVA, a singleton class may be defined using the keyword or attribute "static." The keyword "static" may be applied to all members (e.g., data fields, procedures/functions, etc.) of the singleton class. When a singleton class is instantiated as a singleton object, the singleton object (and one or more members of the singleton object) may be globally accessible to other objects in an application. When a class in the source code 110 uses the singleton design pattern, the compiler system 120 may be able to perform one or more optimizations when generating the application 130 (as discussed below in conjunction with FIGS. 2-4).

In one embodiment, the compiler system 120 may receive a request to generate the application 130 from the source code 110. For example, the compiler system may be invoked or instructed to compile the application using a command or a request provided by a user (e.g., a programmer). In one embodiment, the command or request may be provided using a command line interface (e.g., a user interface that allows users to provide text commands) of a computing device. In another embodiment, the command or request may be user input (e.g., keyboard input of text, mouse or pointer input to click buttons or select options, etc.) provided by a graphical user interface of the compiler system 120 or the computing device. As illustrated in FIG. 1, the class 113 (e.g., the Qaz class) is defined with the keyword or attribute "MAYBE_STATIC." The keyword or attribute MAYBE_STATIC may indicate that the class 113 may be defined as either a singleton class (e.g., a class that is instantiated at most once) or a non-singleton class (e.g., a class that may be instantiated more than once) based on a request or a command provided to the compiler system 120. Although the keyword or attribute MAYBE_STATIC is illustrated in the figures (e.g., FIGS. 1-4), other embodiments may use different keywords/attributes, a different number of keywords/attributes, and/or other data to indicate that a class may be may be defined as either a singleton class or a non-singleton class. For example, a configuration file (instead of an attribute/keyword in the source code 100) may be used to indicate whether a class may be defined as either a singleton class or a non-singleton class and the compiler system 120 may use the configuration file to identify classes that may be defined as either a singleton class or a non-singleton class.

The compiler system 120 may analyze the request or command to determine whether the request or command to generate the application 130 indicates that one or more classes defined using the keyword or attribute MAYBE_STATIC (e.g., class 113) should be defined as a singleton class or a non-singleton class. For example, the compiler system 120 may receive the command "gcc application-.cpp-o application.exe-STATIC" (provided by a user via a command line or other GUI). The command indicates that the compiler system 120 should generate an executable binary application.exe (e.g., application 130) from the source code application.cpp (e.g., the source code 110). The command may also include an option (e.g., a command line option provided via a command line, buttons or fields selected by a user via a GUI, etc.) that indicates whether a class (e.g., class 113) should be defined as a singleton class or a non-singleton class. Referring to the above example, the command includes the option "-STATIC" and this option may indicate that the class 113 (which is defined using the keyword or attribute MAYBE_STATIC) should be defined as a singleton class (e.g., a class that is instantiated at most once), instead of a non-singleton class. In another example the user may provide the command "gcc application.cpp-o application.exe-NO_STATIC." The command indicates that the compiler system 120 should generate an executable binary application.exe (e.g., application 130) from the source code application.cpp (e.g., the source code 110). The command may also include the option "-STATIC" (e.g., a command line option provided via a command line, buttons or fields selected by a user via a GUI) and this option may indicate that the class 113 (which is defined using the keyword or attribute MAYBE_STATIC) should be defined as a singleton class (e.g., a class that may be instantiated at most once), instead of a non-singleton class. Although the options STATIC and NO_STATIC are described in the disclosure, in other embodiments, various other text values, numerical values, options, and/or parameters may be used to indicate to the compiler system 120 whether a class (e.g., class 113) is to be defined as a singleton class or a non-singleton class.

In one embodiment, the compiler system 120 may determine whether a class is to be defined as either a singleton class or a non-singleton class using other data, such as a configuration file. For example, the compiler system 120 may analyze a build file (a file that may provide data or instructions on how to generate the application 130 from the source code 110) or configuration file (e.g., a file that includes data such as settings or options for the generation of the application 130 from the source code 110). In another embodiment, multiple classes defined by the source code 110 may be defined using the keyword or attribute MAYBE_STATIC. For example, the class 113 and the class 111 may both be defined using the keyword or attribute MAYBE_STATIC (not shown in the figures). The compiler system 120 may convert both the class 113 and the class 111 to singleton classes (not shown in the figures).

In one embodiment, if a command or request (or other data such as a build file or configuration file) indicates that one or more classes defined using the keyword or attribute MAYBE_STATIC are to be defined as singleton classes then the compiler system 120 may convert the one or more classes to singleton classes (e.g., convert the class 113 to a "static" class). Referring back to FIG. 1, the application 130 may include or instantiate objects 131, 132, 133, 134, 135, and 136 when the application 130 executes. Object 131 is named F1 and is an instance of the Foo class. Object 132 is named F2 and is an instance of the Foo class. Object 133 is named B1 and is an instance of the Bar class. Object 134 is named B2 and is an instance of the Bar class. Object 135 is named B3 and is an instance of the Bar class. Object 136 is named Q1 and is an instance of the Qaz class. The compiler system 120 may convert the class 113 to a singleton class because the class 113 is defined using the keyword or attribute MAYBE_STATIC and a command or request indicates that the class 113 should be defined as a singleton class. When the class 113 is defined as a singleton class, the application 130 may include at most one instance of the Qaz class, the object 136 (named Q1) when the application 130 executes. If the command or request (or other data such as a build file or configuration file) indicates that one or more classes defined using the keyword or attribute MAYBE_STATIC (e.g., class 113) is to be defined as a non-singleton class, then the compiler system 120 may not convert the class to a singleton class (e.g., may define the class 113 to be a non-singleton class). When the class 113 is to be defined as a non-singleton class, the application may include multiple instances of the class 113 when the application 130 executes (not shown in the figure).

In one embodiment, the compiler system 120 may perform one or more optimizations when generating the application 130 (e.g., when generating the executable binary) when one or more classes are converted to single classes (based on the keyword/attribute MAYBE_STATIC and the request/command to generate the application 130). The optimizations may allow the application 130 to execute more efficiently. For example, the optimizations may allow the application 130 to execute more quickly (e.g., may reduce the time for an application 130 to perform a task or function). In another example, the optimizations may allow the application 130 to execute using less memory (e.g., may reduce the amount of memory used by the application 130 to perform operations and/or store data).

In one embodiment, an optimization may include de-virtualizing virtual functions or methods. A virtual function or virtual method may be a function or method that may be overridden by another function or method in an inheriting class or child class (as discussed below in conjunction with FIG. 4). De-virtualizing a virtual function or virtual method may replace a call to the virtual function or virtual method with a call to the specific function or method (e.g., a specific data member) of the singleton class (as discussed below in conjunction with FIG. 4). De-virtualizing virtual functions may allow the application 130 to execute more quickly. In another embodiment, an optimization may include removing object pointers or references from a method or function call to a member function of the singleton class (as discussed below in conjunction with FIG. 3). Removing object pointers or references may reduce the amount of memory used when application 130 executes and may allow the application 130 to execute more quickly. In a further embodiment, an optimization may include removing object pointers or references used by the application 130 to access data members of the singleton class (as discussed below in conjunction with FIG. 2). Removing object pointers or references used by the application to access data members of the singleton class may reduce the amount of memory used when application 130 executes and may allow the application 130 to execute more quickly. In another embodiment, removing pointers or references used by the application to access data members of the singleton class may reduce the amount of data and/or values that may need to be stored when the application 130 is executing. This may reduce the amount of registers and/or memory used by a processing device to execute the application 130. Reducing the amount of registers and/or memory used by the processing device may be referred to as reducing "register pressure." In a further embodiment, removing pointers or references used by the application 130 to access data members of the singleton class may reduce a number of parameters used by the compiler system 120 when the compiler system 120 makes a function call. Removing pointers or references used by the application to access data members of the singleton class may also simplify and/or reduce the number of low-level operations that may be used by the compiler system 120 to implement a function call in internal representations and/or application binary interfaces.

In one embodiment, the compiler system 120 may not convert the class 113 to a singleton class when the command or request indicates that the class 113 is to be defined as a singleton class. The compiler system 120 may still perform one or more optimizations as if the class 113 had been converted to a singleton class. For example, the compiler system 120 may de-virtualize a virtual function or virtual method without converting the class 113 to a singleton class. In another example, the compiler system 120 may remove object pointers or references from a method or function call to a member function of the class 113 without converting the class 113 to a singleton class. In a further example, the compiler system may remove object pointers or references used when accessing data members of the class 113 without converting the class 113 to a singleton class.

In one embodiment, the compiler system 120 may use link time optimization (LTO) when generating the application 130. Link-time optimization may refer to one or more optimizations performed by the compiler system 120 during the linking phase of the application generation process (e.g., during the generation of the application 130 from the source code 110). After the assembling phase (e.g., after the assembler generates one or more object files), the linker links or merges the object files into one or more executable binaries (during the linking phase). One or more optimizations may be performed by the compiler system 120 during the linking phase. When using LTO, the compiler system 120 may preserve and/or save internal representations or intermediate representations used when generating the application 130. Internal or intermediate representations may be data that identifies various classes, members of the various classes (e.g. data members or function members), and the locations, types and scopes of the various classes and/or the members of the various classes. In another embodiment the compiler system 120 may operate in a mode where the compiler system 120 may assume that the compiler system 120 has access to all of the source code for the application 130. For example, the compiler system 120 may assume that all of the source files for the application 130 are included in the source code 110. The mode where the compiler system 120 assumes that the compiler system 120 has access to all of the source code files for the application 130 may be referred to as whole program mode. Internal representations may be a serialization of the internal data structures used by the compiler system 120. As discussed above, the compiler system 120 may convert the source code 110 into one or more object files. The internal representations may be used by the compiler system 120 when generating the one or more object files.

In one embodiment, the source code 110, the compiler system 120, and the application 130 may reside in different computing devices. For example, the source code 110 may be stored on a data store of a first computing device. The compiler system 120 may reside on a second computing device and the compiler system 120 may retrieve the source code 110 from the first computing device and may generate the application 130. The application 130 may be stored in a third computing device. In another embodiment, one or more of the source code 110, the compiler system 120, and the application 130 may reside on the same computing device. For example, the source code 110, the compiler system 120, and the application 130 may all reside on the same computing device. Examples of computing devices include, but are not limited to, personal computers (PCs), laptops, mobile phones, smart phones, tablet computers, netbook computers, etc.

In one embodiment, the user (e.g., the programmer) may provide data indicating which optimizations the compiler system 120 should perform when generating the application. For example, the user may use a flag, a configuration file, a message, etc., identifying and/or indicating which optimizations should be performed by the compiler system when generating the application.

Figure 2:
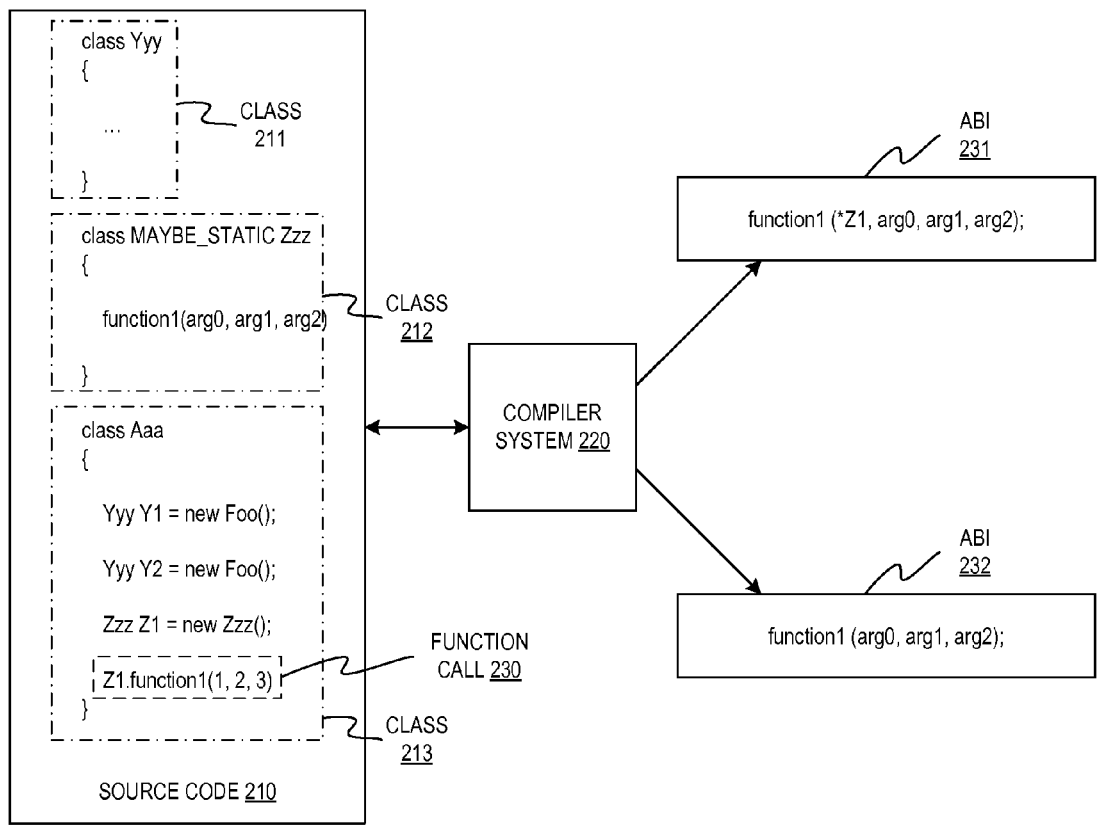
FIG. 2 is a diagram illustrating an example optimization that may be performed when generating an application, in accordance with one embodiment of the present disclosure.

FIG. 2 is a diagram illustrating an example optimization that may be performed when generating an application, in accordance with one embodiment of the present disclosure. Source code 210 may include and/or define classes 211, 212, and 213. Each of the classes 211, 212, and 213 may define members, such as data members (e.g., variables, objects, data structures, etc.) and/or member functions (e.g., methods or functions that perform one or more operations). For example, the class 213 (e.g., the Aaa class) defines data members Y1, Y2 (which are instantiations of the class 211), and Z1 (which is an instantiation of the class 212. In another example, class 212 (e.g., the Zzz class) defines a method or function named "function1." The method or function function1 accepts three parameters, arg0, arg1, and arg2. Each instantiation of a class has its own copy of the members defined by the class. For example, class 211 may define three data members (not shown in the figure). The data members Y1 and Y2 may each include the three data members (e.g., may each have copies of the three data members). As discussed above, the source code 210 may span one or more source code files (e.g., files or documents that include source code). The source code 210 may be in various programming languages including, but not limited to, C++, JAVA, C#, etc. In other embodiments, the source code 210 may include different types and/or different numbers of classes and each class may define different members (e.g., variables, data structures, objects, methods or functions, etc.). Also as discussed above, the compiler system 220 may be an application (e.g., a software module, a program, etc.) and/or a set of applications that may transform the source code (written in a programming language such as C++) into one or more executable binaries (e.g., one or more binary files). The compiler system 220 may include a compiler, an assembler, and a linker. The compiler system 220 may generate an executable binary (e.g., the application 130) using the source code 210.

As illustrated in FIG. 2, the class 212 (e.g., class ZZZ) is defined using the attribute or keyword MAYBE_STATIC. When the compiler system 220 is provided a command or request that indicates that the class 212 is to be defined as a singleton class (e.g., a class that is instantiated at most once), the compiler system 220 may convert the class 212 to a singleton class. As discussed above, when the compiler system 220 determines that the class 212 is to be defined as a singleton class (e.g., is instantiated at most once), the compiler system 220 may convert the class 212 into a singleton class. In another embodiment, the compiler system 220 may not convert the class 212 to a singleton class and may perform one or more optimizations as if the class 212 had been converted to a singleton class.

As discussed above, the compiler system 220 may then perform one or more optimizations when generating the application (e.g., when generating an executable binary). In one embodiment, the compiler system 220 may remove object pointers or references from a method or function call to a member function of the singleton class (or the class that uses a singleton pattern even though the class is not converted to a singleton class). When generating the application 130 (e.g., an executable binary), the compiler system 220 may generate one or more application binary interfaces (ABIs). An ABI may be the interface between two objects in the application. An ABI may provide data or information on how functions or methods of a class are called (e.g., what arguments to pass to a method or function, the data or objects returned by the method or function, etc.), what data format should be used when passing data between objects, the sizes, layout, and alignment of data members of a class, etc. For example, ABI may be generated for the for the function call 230 of the class 213 (e.g., the function call "Z1.function1(1, 2, 3)").

In one embodiment, when the compiler system 220 does not perform an optimization, the compiler system 220 may generate the ABI 231. For example, if the compiler system 220 receives a request or command indicating that the class 212 is to be defined as a non-singleton class, the compiler system 220 may not perform an optimization and may generate the ABI 231. As illustrated in FIG. 2, the ABI 231 indicates that the function call 230 includes three arguments, arg0, arg1, and arg2. The ABI 231 also includes a pointer or a reference (e.g., "*Z1") to the instance of the class Zzz (e.g., a pointer or reference to the object that is the instantiation of the class Zzz). The pointer or reference may be data (e.g., a string, a value, a binary value, a hexadecimal value, an alphanumerical value, etc.) that identifies a location in memory. The pointer or reference *Z1 may point to a location in memory where the object Z1 is stored. When a class is instantiated multiple times (e.g., there are multiple objects), the pointer or reference in an ABI may help ensure that the correct function or method from the correct instance of the class is used by the application.

In another embodiment, when the compiler system 220 does perform an optimization, the compiler system 220 may generate the ABI 232. For example, if the compiler system 220 receives a request or command indicating that the class 212 is to be defined as a singleton class, the compiler system 220 may perform an optimization and may generate the ABI 232. As illustrated in FIG. 2, the ABI 231 indicates that the function call 230 includes three arguments, arg0, arg1, and arg2. The ABI 232 does not include a pointer or a reference (e.g., does not include "*Z1") to the instance of the class Zzz because the compiler system 220 may determine that the class 212 is instantiated at most once when the application executes. The compiler system 220 may not include and/or may remove the pointer or reference for an object when generating ABI 232 because there is at most one instance of the class and thus the application may not be able to use the function or method of another instance of the class. Removing object pointers or references may reduce the amount of memory used when application executes. For example, because less information is in the ABI 232, the application may use less memory and/or storage space. Removing object pointers or references may also allow the application to execute more quickly because the application may not need to access extra memory locations in order to obtain the reference or pointer to an object when executing a method or function. In another embodiment, removing pointers or references used by the application to access data members of the singleton class may reduce the amount of data and/or values that may need to be stored when the application 130 is executing. This may reduce the amount of registers and/or memory used by a processing device to execute the application 130. Reducing the amount of registers and/or memory used by the processing device may be referred to as reducing "register pressure." In a further embodiment, removing pointers or references used by the application 130 to access data members of the singleton class may reduce a number of parameters used by the compiler system 220 when the compiler system 220 makes a function call. Removing pointers or references used by the application to access data members of the singleton class may also simplify and/or reduce the number of low-level operations that may be used by the compiler system 220 to implement a function call in internal representations and/or application binary interfaces.

Figure 3:
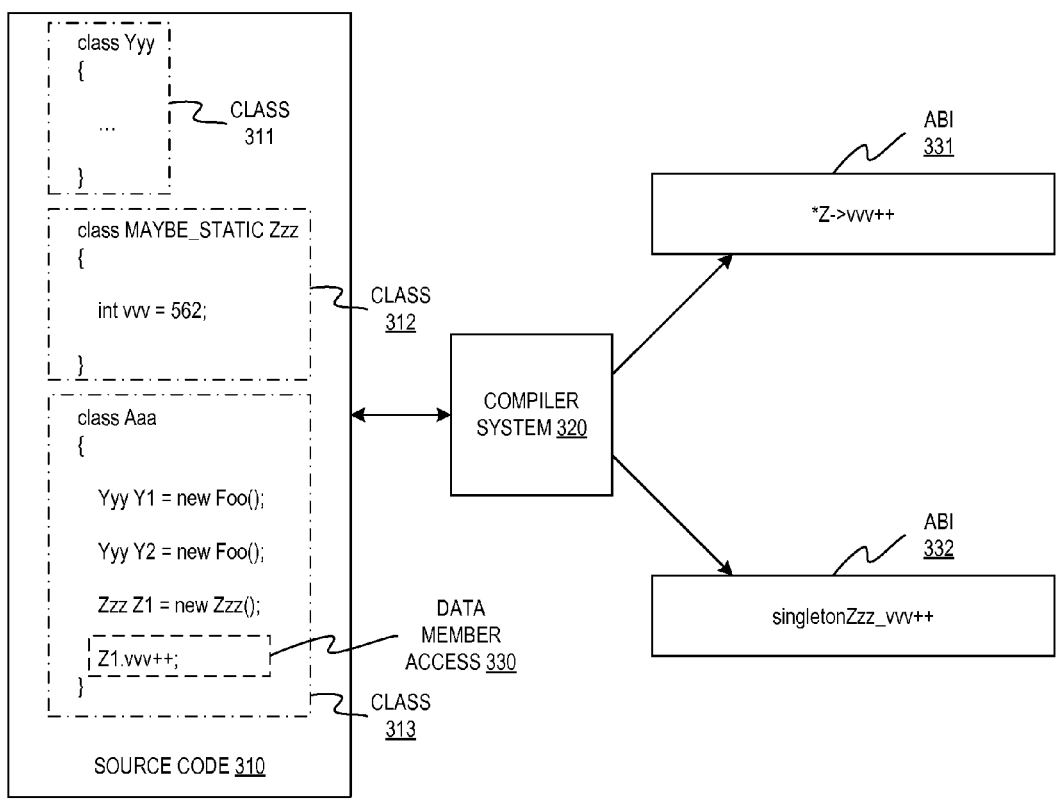
FIG. 3 is a diagram illustrating an example optimization that may be performed when generating an application, in accordance with another embodiment of the present disclosure.

FIG. 3 is a diagram illustrating an example optimization that may be performed when generating an application, in accordance with another embodiment of the present disclosure. Source code 310 may include and/or define classes 311, 312, and 313. Each of the classes 311, 312, and 313 may define members, such as data members (e.g., variables, objects, data structures, etc.) and/or member functions (e.g., methods or functions that perform one or more operations). For example, the class 312 (e.g., the Zzz class) defines a data member (e.g., a variable) named "vvv." The data member vvv may be a variable that stores the integer value 562. Y1 and Y2 (defined in class 313) are instantiations of class 311 and Z1 (also defined in class 313) is an instantiation of class 312. Each instantiation of a class has its own copy of the members defined by the class. For example, class 311 may define two data members (not shown in the figure). The data members Y1 and Y2 may each include the two data members (e.g., may each have copies of the two data members). As discussed above, the source code 310 may span one or more source code files (e.g., files or documents that include source code). The source code 310 may be in various programming languages including, but not limited to, C++, JAVA, C#, etc. In other embodiments, the source code 310 may include different types and/or different numbers of classes and each class may define different members (e.g., variables, data structures, objects, methods or functions, etc.). Also as discussed above, the compiler system 320 may be an application (e.g., a software module, a program, etc.) and/or a set of applications that may transform the source code (written in a programming language such as C++) into one or more executable binaries (e.g., one or more binary files). The compiler system 320 may include a compiler, an assembler, and a linker. The compiler system 320 may generate an executable binary (e.g., an application) using the source code 310.

As illustrated in FIG. 3, the class 312 (e.g., class ZZZ) is defined using the attribute or keyword MAYBE_STATIC. When the compiler system 320 is provided a command or request that indicates that the class 312 is to be defined as a singleton class (e.g., a class that is instantiated at most once), the compiler system 320 may convert the class 312 to a singleton class. As discussed above, when the compiler system 320 determines that the class 312 is to be defined as a singleton class (e.g., based on the request or command to generate the application) the compiler system 320 may convert the class 312 into a singleton class. In another embodiment, the compiler system 320 may not convert the class 312 to a singleton class and may perform one or more optimizations as if the class 312 had been converted to a singleton class.

As discussed above, the compiler system 320 may then perform one or more optimizations when generating the application (e.g., when generating an executable binary). Also as discussed above, when generating an application (e.g., an executable binary), the compiler system 320 may generate one or more ABIs. An ABI may provide data or information on the sizes, layout, and alignment of data members of a class, how to perform operations on data members of the class, and how to access data members of the class. In one embodiment, the compiler system 320 may remove object pointers or references that may be used by the application to access data members of the class 312.

In one embodiment, when the compiler system 320 does not perform an optimization, the compiler system 320 may generate the ABI 331. For example, if the compiler system 320 receives a request or command indicating that the class 312 is to be defined as a non-singleton class, the compiler system 320 may not perform an optimization and may generate the ABI 331. As illustrated in FIG. 2, the ABI 331 indicates that the variable vvv (e.g., data member) is incremented by one (e.g., 1 is added to the value of vvv). The ABI 331 also includes a pointer or a reference (e.g., "*Z1") to the instance of the class Zzz (e.g., a pointer or reference to the object that is the instantiation of the class Zzz). The pointer or reference may be data (e.g., a string, a value, a binary value, a hexadecimal value, an alphanumerical value, etc.) that identifies a location in memory. The pointer or reference *Z1 may point to a location in memory where the object Z1 is stored. When a class is instantiated multiple times (e.g., there are multiple objects), the pointer or reference in an ABI may help ensure that the correct data member from the correct instance of the class is accessed by the application.

In another embodiment, when the compiler system 320 does perform an optimization, the compiler system 320 may generate the ABI 332. For example, if the compiler system 320 receives a request or command indicating that the class 312 is to be defined as a singleton class, the compiler system 320 may not perform an optimization and may generate the ABI 332. As illustrated in FIG. 2, the ABI 331 indicates that the variable vvv (e.g., data member) is incremented by one (e.g., 1 is added to the value of vvv). The ABI 332 does not include a pointer or a reference (e.g., does not include "*Z1") to the instance of the class Zzz because the compiler system 320 may determine that the class 312 is instantiated at most once when the application executes. The compiler system 320 may not include and/or may remove the pointer or reference for an object when generating ABI 332 because there is at most one instance of the class and thus the application may not be able to use (e.g., increment) the variable vvv from another instance of the class. The ABI 332 includes a global reference to the variable vvv (e.g., "singletonZzz_vvv") and also indicates that the value of the variable vvv should be incremented by 1 (e.g., "++"). Removing object pointers or references may reduce the amount of memory used when application 130 executes. For example, because less information is in the ABI 332, the application 130 may use less memory and/or storage space. Removing object pointers or references may also allow the application 130 to execute more quickly because the application may not need to access extra memory locations in order to obtain the reference or pointer to an object when executing a method or function. In another embodiment, removing pointers or references used by the application to access data members of the singleton class may reduce the amount of data and/or values that may need to be stored when the application 330 is executing. This may reduce the amount of registers and/or memory used by a processing device to execute the application 330. Reducing the amount of registers and/or memory used by the processing device may be referred to as reducing "register pressure." In a further embodiment, removing pointers or references used by the application 330 to access data members of the singleton class may reduce a number of parameters used by the compiler system 320 when the compiler system 320 makes a function call. Removing pointers or references used by the application to access data members of the singleton class may also simplify and/or reduce the number of low-level operations that may be used by the compiler system 320 to implement a function call in internal representations and/or application binary interfaces.

Figure 4:
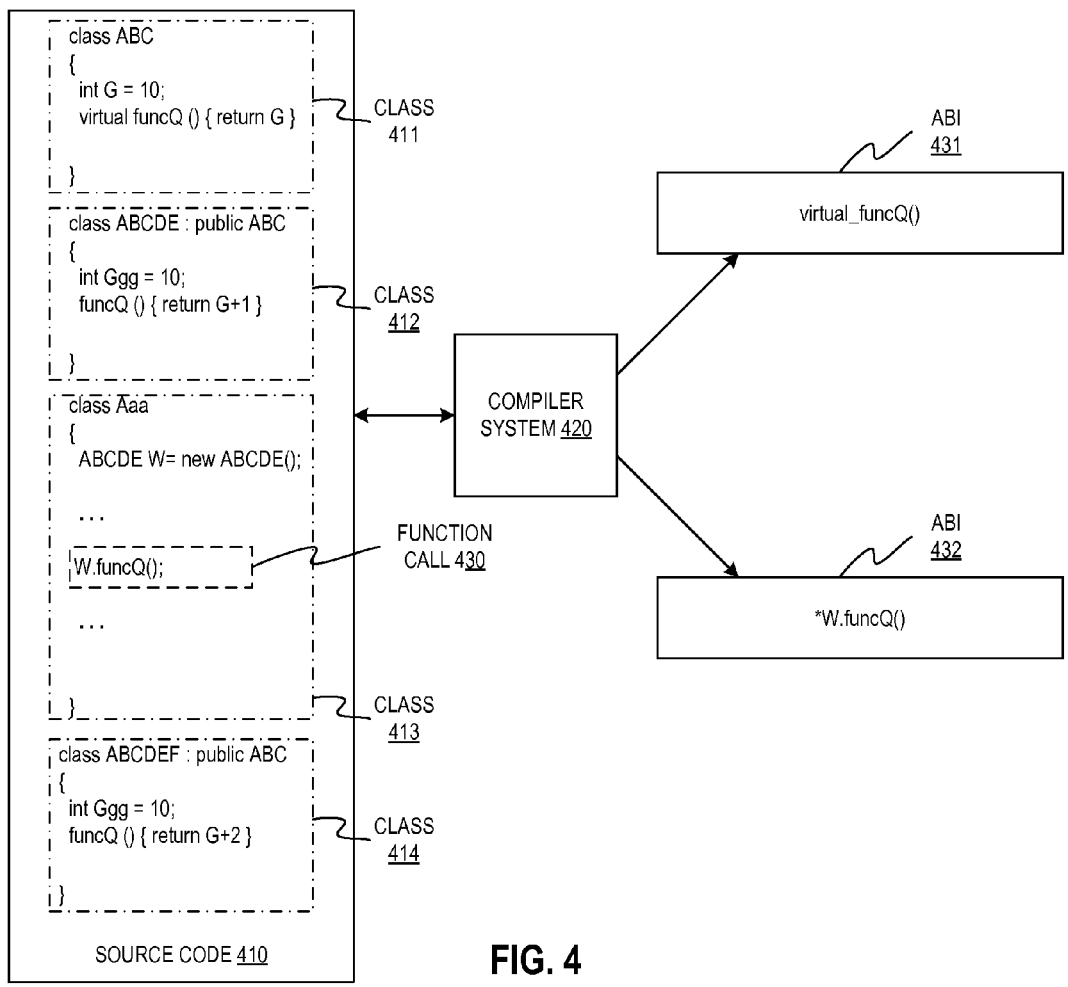
FIG. 4 is a diagram illustrating an example optimization that may be performed when generating an application, in accordance with a further embodiment of the present disclosure.

FIG. 4 is a diagram illustrating an example optimization that may be performed when generating an application, in accordance with a further embodiment of the present disclosure. Source code 410 may include and/or define classes 411, 412, 413, and 414. Each of the classes 411, 412, 413, and 414 may define members, such as data members (e.g., variables, objects, data structures, etc.) and/or member functions (e.g., methods or functions that perform one or more operations). As discussed above, the source code 410 may span one or more source code files (e.g., files or documents that include source code). The source code 410 may be in various programming languages including, but not limited to, C++, JAVA, C#, etc. In other embodiments, the source code 410 may include different types and/or different numbers of classes and each class may define different members (e.g., variables, data structures, objects, methods or functions, etc.). Also as discussed above, the compiler system 420 may be an application (e.g., a software module, a program, etc.) and/or a set of applications that may transform the source code (written in a programming language such as C++) into one or more executable binaries (e.g., one or more binary files). The compiler system 420 may include a compiler, an assembler, and a linker. The compiler system 420 may generate an executable binary (e.g., an application) using the source code 410. As illustrated in the source code 410, the class 412 (e.g., the ABCDE class) is a child class (also referred to as an inherited class, a subclass, a derived class, etc.) of the class 411 (e.g., the ABC class). The class 411 may be referred to as a base class, a superclass, or a parent class. The class 412 (e.g., the child class) may inherit members (e.g., data members and/or member functions) from the class 411 (e.g., the parent class). The class 412 may also define different members from the class 411 and/or modify members inherited from a parent class. As illustrated in FIG. 4, the method or function "funcQ" in the class 411 is a virtual function. The virtual function may be overridden by a function in a child class (e.g., in class 412). For example, the method or function "funcQ" in the class 411 (e.g., the parent class) returns the value of the variable G. the method or function "funcQ" in class 412 (e.g., the child class) overrides the virtual function "funcQ" of the class 411 by adding the value 1 to the variable G and then returning a number that is one more than the value of the variable G (rather than the value of G itself). The class 414 (e.g., the ABCDEF class) is a child class (also referred to as an inherited class, a subclass, a derived class, etc.) of the class 411 (e.g., the ABC class). The class 414 (e.g., the child class) may inherit members (e.g., data members and/or member functions) from the class 411 (e.g., the parent class). The class 414 may also define different members from the class 411 and/or modify members inherited from a parent class.

As illustrated in FIG. 4, the method or function "funcQ" in the class 411 is a virtual function. The virtual function may be overridden by a function in a child class (e.g., in class 414). For example, the method or function "funcQ" in the class 411 (e.g., the parent class) returns the value of the variable G. the method or function "funcQ" in class 414 (e.g., the child class) overrides the virtual function "funcQ" of the class 411 by adding the value 2 to the variable G and then returning a number that is one more than the value of the variable G (rather than the value of G itself).

As illustrated in FIG. 4, the class 412 (e.g., the ABCDE class) is defined using the attribute or keyword MAYBE_STATIC. When the compiler system 420 is provided a command or request that indicates that the class 412 is to be defined as a singleton class (e.g., a class that is instantiated at most once), the compiler system 420 may convert the class 412 to a singleton class. As discussed above, when the compiler system 420 determines that the class 412 is to be defined as a singleton class (e.g., based on the request or command to generate the application) the compiler system 420 may convert the class 412 into a singleton class. In another embodiment, the compiler system 420 may not convert the class 412 to a singleton class and may perform one or more optimizations as if the class 412 had been converted to a singleton class.

As discussed above, the compiler system 420 may then perform one or more optimizations when generating the application (e.g., when generating an executable binary). Also as discussed above, when generating an application (e.g., an executable binary), the compiler system 420 may generate one or more ABIs. An ABI may provide data or information on the sizes, layout, and alignment of data members of a class and on how to access data members of the class. In one embodiment, the compiler system 420 may de-virtualize a function call to a member function of the class 412.

In one embodiment, when the compiler system 420 does not perform an optimization, the compiler system 420 may generate the ABI 431. For example, if the compiler system 420 receives a request or command indicating that the class 412 is to be defined as a non-singleton class, the compiler system 420 may not perform an optimization and may generate the ABI 431. As illustrated in FIG. 4, the ABI 431 indicates that the function funcQ is a virtual function defined by a parent class (e.g., class 411). During execution of the application 430, the application 430 may determine which of the child classes has been instantiated and may determine which object was referenced by the call to the method or function funcQ. The application 430 may access the method of function funcQ of the object referenced by the call to the function funcQ. Using virtual functions may slow down the execution of the application 430 because the application 430 may not be able to identify the correct version of the method or function funcQ without first determining which of the child classes the function call to the function funcQ refers to.

In another embodiment, when the compiler system 420 does perform an optimization, the compiler system 420 may generate the ABI 432. For example, if the compiler system 420 receives a request or command indicating that the class 412 is to be defined as a singleton class, the compiler system 420 may perform an optimization and may generate the ABI 432. As illustrated in FIG. 4, the ABI 432 may replace the virtual function call with a direct function call to the function funcQ in the instance of the class 412 because the class 412 is instantiated at most once (e.g., because the class 412 uses the singleton pattern). Including the direct function call to the function funcQ in the instance of class 412 may allow the application to execute more quickly because the application does not determine which one of the child classes was referenced by the call to the function. In one embodiment, the compiler system 420 may perform an inline substitution when generating the ABI 432. When performing the inline substation, the compiler system 420 may replace a function call with the operations performed by the function calls. For example, referring to FIG. 4, the compiler system 420 may replace the function call to the function funcQ( ) with operation "return G+1" (e.g., with the operations performed by the function funcQ). Inline substitution may also be referred to as "inlining."

Figure 5:
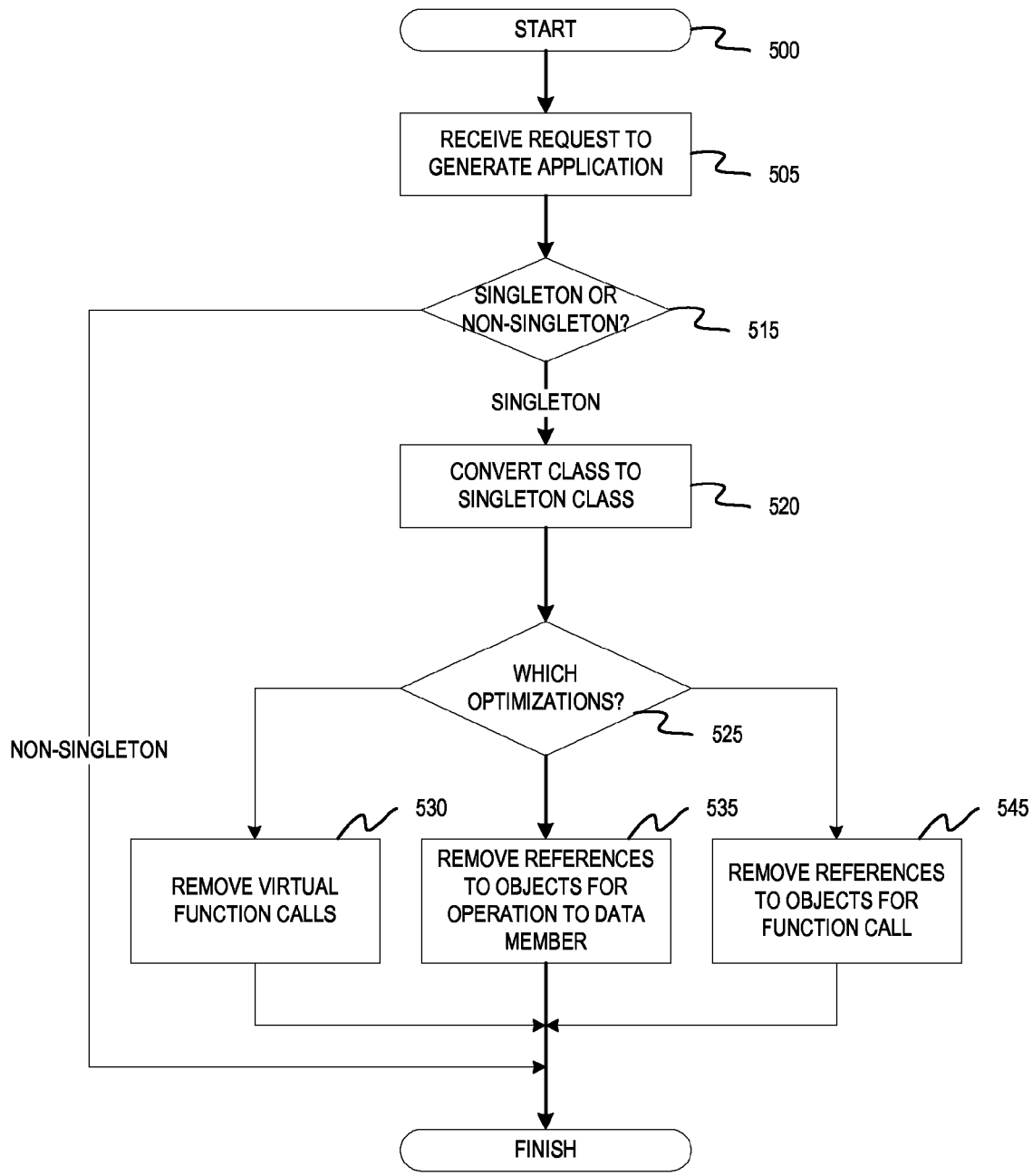
FIG. 5 is a flow diagram illustrating an implementation for a method of performing an optimization during the generation of an application, in accordance with one embodiment of the present disclosure.

FIG. 5 is a flow diagram illustrating an implementation for a method of performing an optimization during the generation of an application, in accordance with one embodiment of the present disclosure. For simplicity of explanation, the method 500 is depicted and described as a series of acts. However, acts in accordance with this disclosure can occur in various orders and/or concurrently and with other acts not presented and described herein. Furthermore, not all illustrated acts may be required to implement the method 500 in accordance with the disclosed subject matter. In addition, those skilled in the art will understand and appreciate that the method 500 could alternatively be represented as a series of interrelated states via a state diagram or events. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by a compiler system, as illustrated in FIGS. 1 through 4.

Referring to FIG. 5, the method 500 begins at block 505 where the processing logic receives a request to generate an application from source code. For example the processing logic may receive a command (e.g., a "gcc" command) via a command line interface of a computing device. At block 515, determines whether the command indicates whether a class in the source code (that is defined using the keyword or attribute MAYBE_STATIC) is to be defined as a singleton class or a non-singleton class. For example, the processing logic may analyze a command or request to determine whether a command or option (indicating whether the class is to be defined as a singleton class or a non-singleton class) is included in the command or request. If the class is to be defined as a non-singleton class, the method 500 ends. If the class is to be defined as a singleton class, the processing logic proceeds to block 520 where the processing logic converts the class to a singleton class. In one embodiment, the block 520 may be optional (e.g., the processing logic may not convert the class to a singleton class).

At block 525, the processing logic determines which optimizations should be performed when generating the application. For example, as discussed above, a user (e.g., a programmer) may provide data (e.g., a flag, a message, a configuration file, etc.) indicating which optimizations should be performed when generating the application. If an indication to de-virtualize virtual functions is received by the processing logic, the processing logic proceeds to block 530 where the processing logic removes virtual function calls (as discussed above in conjunction with FIG. 4). If an indication to remove pointers or references to objects for operations to a data member of the class is received by the processing logic, the processing logic proceeds to block 535 where the processing logic removes the pointers or references to objects (as discussed above in conjunction with FIG. 3). If an indication to removes pointers or references to objects for function calls is received by the processing logic, the processing logic proceeds to block 540 where the processing logic removes the pointers or references to objects (as discussed above in conjunction with FIG. 2). In one embodiment, the processing logic may proceed to one or more of the blocks 530, 535, and/or 540 after block 525. In one embodiment (not shown in FIG. 5), the processing logic may proceed back to block 515 after blocks 530, 535, and/or 545. For example, the optimizations performed at blocks 530, 535, and/or 545 may result in simplifications to the ABI and/or internal representations that could lead to one or more additional classes being identified as singleton classes. The processing logic may proceed back to block 515 to perform optimizations one the one or more newly identified singleton classes.

Figure 6:
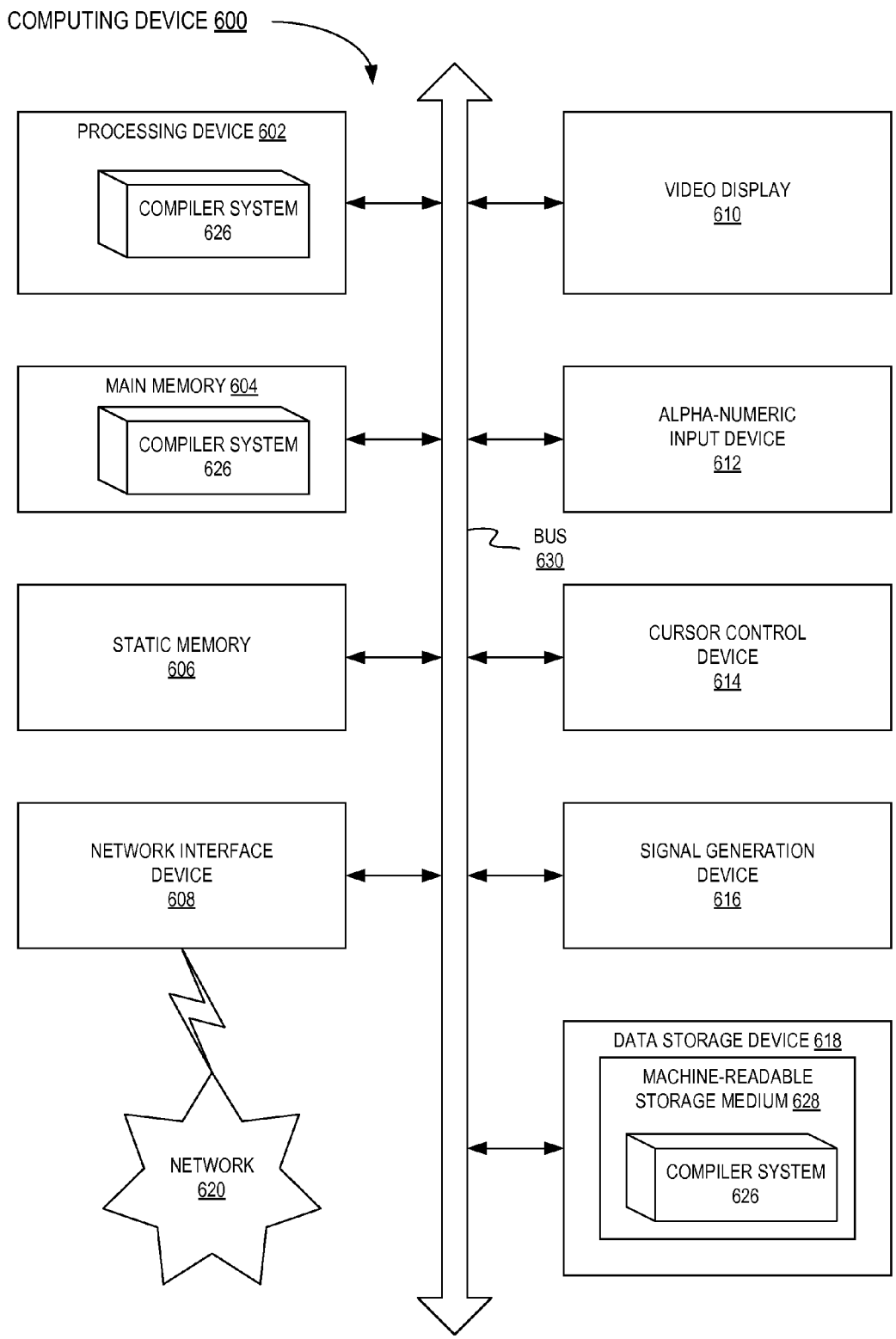
FIG. 6 is a block diagram of an example computer system that may perform one or more of the operations described herein.

FIG. 6 illustrates a diagrammatic representation of a machine in the example form of a computing device 600 within which a set of instructions, for causing the machine to perform any one or more of the methodologies discussed herein, may be executed. The computing device 600 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute compiler system 626 for performing the operations and steps discussed herein.

The computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and a signal generation device 616 (e.g., a speaker). In one embodiment, the video display unit 610, the alphanumeric input device 612, and the cursor control device 614 may be combined into a single component or device (e.g., an LCD touch screen).

The data storage device 618 may include a computer-readable storage medium 628 on which is stored one or more sets of instructions (e.g., compiler system 626) embodying any one or more of the methodologies or functions described herein. The compiler system 626 may also reside, completely or at least partially, within the main memory 604 and/or within the processing device 602 during execution thereof by the computing device 600, the main memory 604 and the processing device 602 also constituting computer-readable media. The instructions may further be transmitted or received over a network 620 via the network interface device 608.

While the computer-readable storage medium 628 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating," "determining," "converting," "performing," "removing," "receiving," "de-virtualizing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device, a first request to generate an application from source code, wherein the source code comprises a class, and wherein the first request specifies a first value;
   generating by the processing device, in response to the first request, a first instance of the application, wherein in view of the first value, the class is implemented in the first instance as a singleton and at most one object of the class exists in the first instance at any time;
   receiving, by the processing device, a second request to generate the application from the source code, wherein the second request specifies a second value that is different than the first value; and
   generating by the processing device, in response to the second request, a second instance of the application, wherein in view of the second value, the class is implemented in the second instance as a non-singleton.

2. The method of claim 1, further comprising performing an optimization during the generation of the first instance of the application.

3. The method of claim 2, wherein performing the optimization comprises:
   de-virtualizing a virtual function call.

4. The method of claim 2, wherein performing the optimization comprises:
   removing a reference to an instance of the class from an application binary interface, wherein the application binary interface defines an operation on a data member of the instance of the class.

5. The method of claim 2, wherein performing the optimization comprises:
   removing a reference to an instance of the class from an application binary interface, wherein the application binary interface comprises a call to a function of the class.

6. The method of claim 2, further comprising:
   receiving data indicative of the optimization to be performed.

7. The method of claim 1, wherein the class comprises an attribute indicating that the class is to be implemented as either a singleton or a non-singleton.

8. The method of claim 1, wherein
   the first request specifies the first value as a command line option.

9. An apparatus, comprising:
   a memory to store source code; and
   a processing device operatively coupled to the memory, the processing device to:
      receive a first request to generate an application from the source code, wherein the source code comprises a class, and wherein the first request identifies a first configuration file, and wherein the first configuration file specifies a first value;
      generate, in response to the first request, a first instance of the application, wherein in view of the first value, the class is implemented in the first instance as a singleton and at most one object of the class exists in the first instance at any time;

receive a second request to generate the application from the source code, wherein the second request identifies a second configuration file, and wherein the second configuration file specifies a second value that is different than the first value; and generate, in response to the second request, a second instance of the application, wherein in view of the second value, the class is implemented in the second instance as a non-singleton.

10. The apparatus of claim 9, wherein the processing device is further to:

perform an optimization during the generation of the first instance of the application.

11. The apparatus of claim 10, wherein to perform the optimization, the processing device is further to:

de-virtualize a virtual function call.

12. The apparatus of claim 10, wherein to perform the optimization , the processing device is further to:

remove a reference to an instance of the class from an application binary interface, wherein the application binary interface defines an operation on a data member of the instance of the class.

13. The apparatus of claim 10, wherein to perform the optimization, the processing device is further to:

remove a reference to an instance of the class from an application binary interface, wherein the application binary interface comprises a call to a function of the class.

14. The apparatus of claim 10, wherein the processing device is further to:

receive data indicative of the optimization to be performed.

15. A non-transitory computer readable storage medium comprising instructions that, when executed by a processing device, cause the processing device to:

receive a first request to generate an application from source code, wherein the source code comprises a class, and wherein the first request specifies a first value;

generate by the processing device, in response to the first request, a first instance of the application, wherein in view of the first value, the class is implemented in the first instance as a singleton and at most one object of the class exists in the first instance at any time;

receive, by the processing device, a second request to generate the application from the source code, wherein the second request specifies a second value that is different than the first value; and generate by the processing device, in response to the second request, a second instance of the application, wherein in view of the second value, the class is implemented in the second instance as a non-singleton.

16. The non-transitory computer readable storage medium of claim 15, wherein the instructions further cause the processing device to:

perform an optimization during the generation of the first instance of the application.

17. The non-transitory computer readable storage medium of claim 16, wherein the instructions further cause the processing device to:

de-virtualize a virtual function call.

18. The non-transitory computer readable storage medium of claim 16, wherein the instructions further cause the processing device to:

remove a reference to an instance of the class from an application binary interface, wherein the application binary interface defines an operation on a data member of the instance of the class.

19. The non-transitory computer readable storage medium of claim 16, wherein the instructions further cause the processing device to:

remove a reference to an instance of the class from an application binary interface, wherein the application binary interface comprises a call to a function of the class.

20. The non-transitory computer readable storage medium of claim 16, wherein the instructions further cause the processing device to:

receive data indicative of the optimization to be performed.

* * * * *